United States Patent [19]

Morita

[11] Patent Number: 5,244,283
[45] Date of Patent: Sep. 14, 1993

[54] DOUBLE RAIL LINEAR MOTION GUIDE ASSEMBLY

[75] Inventor: Kunihiko Morita, Koganei, Japan

[73] Assignee: Nippon Thompson Co., Ltd., Japan

[21] Appl. No.: 651,702

[22] Filed: Feb. 5, 1991

[30] Foreign Application Priority Data

Feb. 5, 1990 [JP] Japan ................. 2-25676

[51] Int. Cl.$^5$ ............................................. F16C 29/06
[52] U.S. Cl. .......................................... 384/44; 384/45
[58] Field of Search ............................. 384/44, 45, 43; 464/168

[56] References Cited

U.S. PATENT DOCUMENTS

| | | | |
|---|---|---|---|
| 4,603,922 | 8/1986 | Teramachi | 384/44 |
| 4,988,215 | 1/1991 | Osawa | 384/45 |
| 5,005,988 | 4/1991 | Lyon | 384/44 |

Primary Examiner—Lenard A. Footland
Attorney, Agent, or Firm—Skjerven, Morrill, MacPherson, Franklin & Friel

[57] ABSTRACT

A double rail linear motion guide assembly suitable for carrying a load large in weight and size is provided. A pair of main and auxiliary guide rails are fixedly attached to a base. An inner guide groove is formed at each of the side surfaces of the main guide rail having a rectangular cross section. A U-shaped main slider provided with a pair of endless circulating paths is fixedly attached to a table and slidably mounted on the main guide rail in a straddling fashion and formed with an outer guide groove at its inner side surface. A plurality of rolling members are provided in the endless circulating paths. The auxiliary guide rail has a flat top guide surface and at least one flat bottom guide surface. An auxiliary slider having either a generally C-shaped or L-shaped cross section is fixedly attached to the table and slidably mounted on the auxiliary guide rail and is formed with endless circulating paths filled with rolling members. A predetermined gap is provided between any vertical side surface of the auxiliary guide rail and an opposite vertical side surface of the auxiliary slider to thereby allow a relative movement in the transverse direction between the auxiliary guide rail and the auxiliary slider.

13 Claims, 5 Drawing Sheets

DOUBLE RAIL LINEAR MOTION GUIDE ASSEMBLY

BACKGROUND OF THE INVENTION

1. Field of the Invention

This invention generally relates to a linear motion rolling contact guide assembly suitable for use in carrying a relatively large load over a relatively long distance at a relatively high accuracy, and, in particular, to a linear motion guide assembly having a pair of guide rails.

2. Description of the Prior Art

A linear motion rolling contact guide unit or assembly is well known in the art and it is widely used for guiding a moving part in various applications, such as machining tools, robots, and precision measuring, testing and processing apparatuses. Such a linear motion rolling contact guide unit, or LM guide unit for short, generally includes a rail extending straight over a desired length, a slider slidably mounted on the rail and a plurality of rolling members, such as balls and rollers, interposed between the rail and the slider. Typically, a rail has a rectangular cross section with a pair of opposed side surfaces, each formed with a generally V-shaped guide groove, and the slider has a generally U-shaped cross section, including a horizontal section and a pair of vertical sections, each depending from a corresponding side of the horizontal section. Each of the vertical sections of the slider has an inner surface which is formed with a load path section of an endless circulating path, in which a plurality of rolling members are provided. The load path section is located opposite to the corresponding guide groove of the rail so that a channel is defined therebetween. The rolling members are interposed between the guide groove of the rail and the load path section so that a rolling contact is provided between the rail and the slider.

Such a typical linear motion guide unit is useful in many applications; however, its applications are somewhat limited when it is required to carry a load which is relatively large in size as well as in weight over a relatively long distance at high accuracy. That is, if it is required to carry a load which is relatively large in width and weight, the slider must be made larger in width. However, such a structure would bring about a stability problem. In order to cope with such a situation, there has been proposed an improved linear motion guide unit having a pair of rails suitable for carrying a load relatively large in size and weight over a relatively long distance at a relatively high accuracy as shown in FIGS. 4 and 5.

Figure 4:
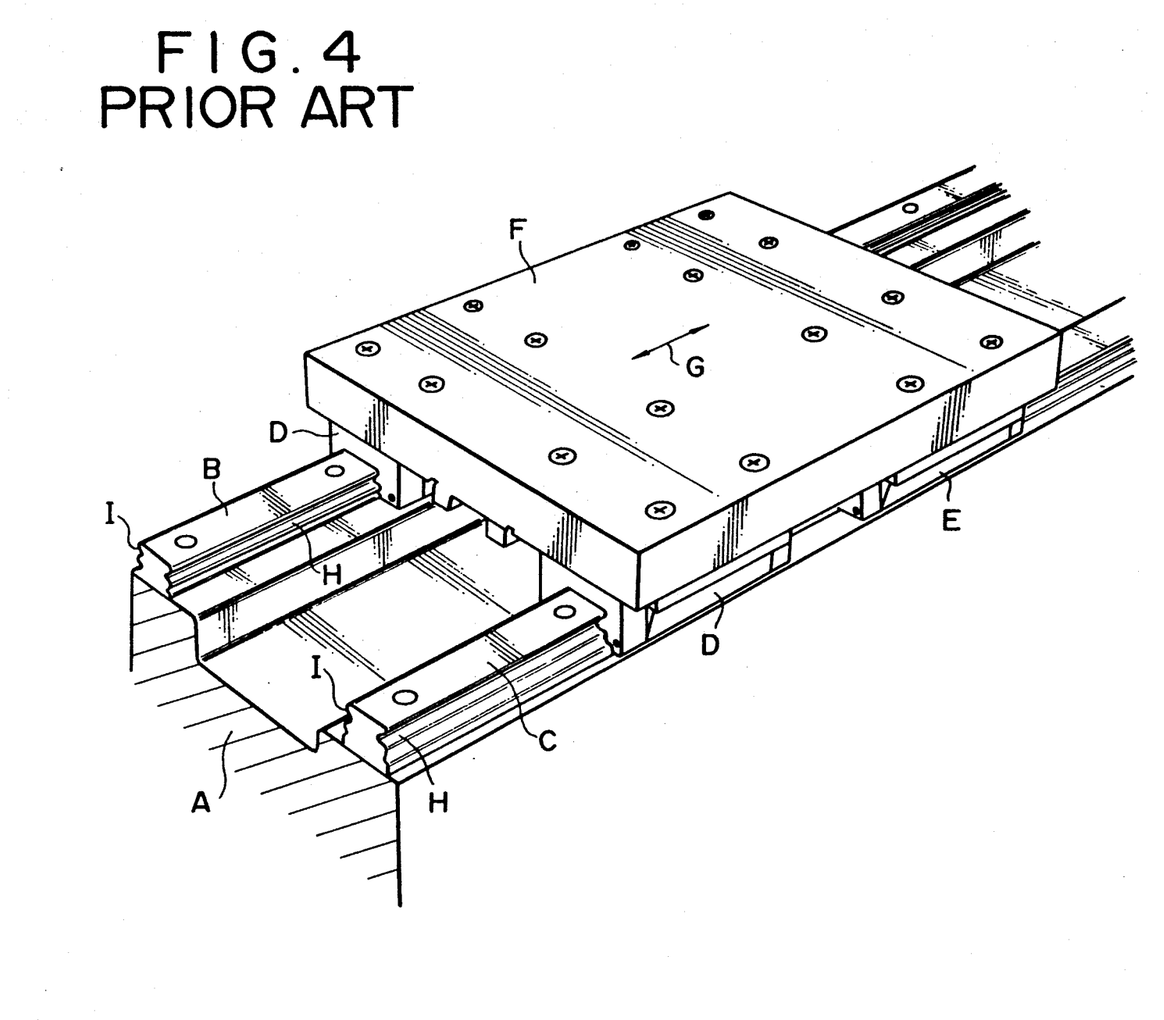
FIGS. 4 and 5 are schematic illustrations showing the prior art double rail linear motion guide assemblies suitable for carrying a load relatively large in size as well as in weight.

FIG. 4 shows a prior art linear motion guide unit including a pair of guide rails B and C, which are fixedly and parallely mounted on a bed A, a pair of sliders D and E, which are slidably mounted on the guide rails B and C, respectively, and a slide table F which are fixedly mounted on both of the sliders D and E. The slide table F may be fixedly attached to any desired object, which can be moved back and forth relative to the guide rails B and C and thus the bed A linearly as indicated by a double headed arrow G. Each of the guide rails B and C is formed with a pair of guide grooves H and I on both opposite side surfaces thereof extending in parallel to the longitudinal axis of the rail B or C. Each of the sliders D and E has a generally U-shaped cross section and it is mounted on the corresponding guide rail B or C in a straddling manner. And, each of the sliders D and E is formed with a pair of endless circulating paths, each of which includes a load path section, a return path section and a pair of curved connecting path sections, connecting the corresponding ends of the load and return path sections. A plurality of rolling members are provided in each of the endless circulating paths. The load path section is located opposite to the corresponding guide groove H or I of the rail B or C, and the rolling members are partly exposed when located at the load path section and thus brought in contact with the corresponding guide groove H or I. Since the guide grooves H and I are generally V-shaped in cross section, the rolling members located in the load path section carry not only horizontal loads but also vertical loads.

With such a structure, however, when errors are present in the parallel arrangement between the two guide rails B and C, the sliding resistance varies as the slide table F moves along the guide rails B and C so that the accuracy and performance can deteriorate significantly. Besides, its service life can be shortened radically. In addition, since the high accuracy is required in the arrangement between the two guide rails B and C, an extreme care is required in mounting these guide rails B and C on the bed A, which would require high skills and experiences. It is almost impossible to mount these guide rails B and C at an accuracy of a few microns or less if their lengths become a few meters or more.

Figure 5:
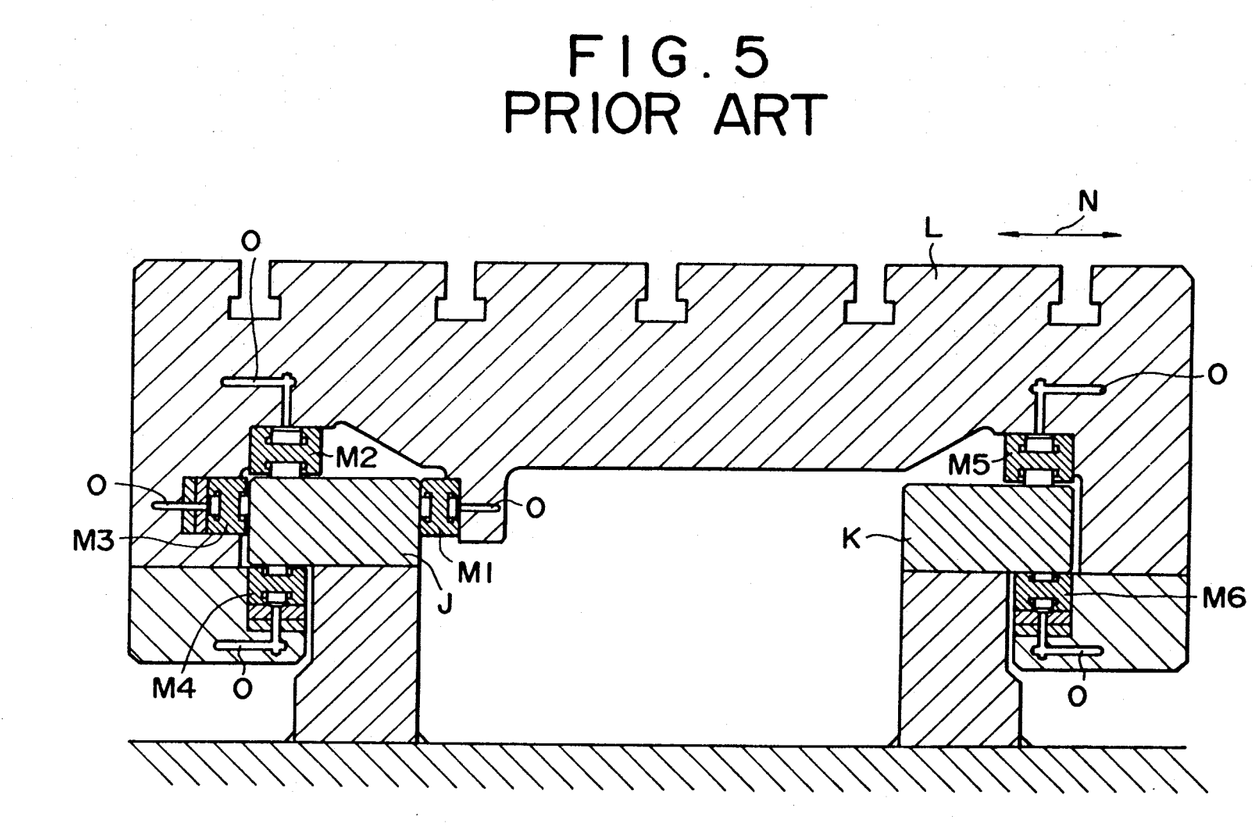

FIG. 5 shows another prior art linear motion guide unit suitable for carrying a load relatively large in weight as well as in size. This linear motion guide unit includes a pair of guide rails J and K, which are fixedly mounted on a base, a slide table L which is generally U-shaped in cross section and slidably mounted on the pair of guide rails J and K, and a plurality (six in the illustrated example) of endless circulating type bearing units M1–M6 interposed between the rails J and K and the slide table L. The first four bearing units M1–M4 are fixedly attached to the slide table L such that each of them establishes a rolling contact with a corresponding one of top, bottom and a pair of side surfaces of the guide rail J. The remaining two bearing units M5 and M6 are fixedly attached to the slide table L such that they are in rolling contact with the top and bottom surfaces of the guide rail K, respectively. With this structure, vertical loads are carried by bearing units M2, M4, M5 and M6; whereas, horizontal loads are carried by bearing units M1 and M3.

With this structure, since there is no constraints in the horizontal direction between the guide rail K and the slide table L, the relative positional relationship between the guide rail K and the bearing units M5 and M6 may vary as indicated by a double headed arrow N so that errors in the arrangement between the two guide rails J and K can be absorbed. In this case, however, this structure requires the provision of a relatively large number of endless circulating bearing units, which are relatively large in size, in particular its height. In addition, since such an endless circulating bearing unit requires lubrication, a large number of lubricant supplying paths O must be formed in the table L. As a result, such a structure tends to be large in size and complicated in structure, which, in turn, tends to push up the cost. In addition, such a structure prohibits the utilization of readily available, well-known linear motion guide units.

SUMMARY OF THE INVENTION

In accordance with the present invention, there is provided a linear motion guide unit particularly suitable for use in carrying a load which is relatively large in weight as well as in size, in particular its width. The present linear motion guide unit includes a pair of main and auxiliary guide rails which are fixedly attached to a base. The main guide rail includes a pair of opposite side surfaces, each of which is formed with an inner guide groove extending in parallel with the longitudinal axis thereof. The auxiliary guide rail, on the other hand, has at least a top guide surface.

The linear motion guide unit also includes a pair of main and auxiliary sliders, which are fixedly attached to a common slide table. The main slider has a generally U-shaped cross section and thus includes at least a horizontal section and a pair of vertical sections, each depending from a corresponding side of the horizontal section. Each of the vertical sections has an inner side surface which is formed with an outer guide groove which in turn is located opposite to the associated inner guide groove of the main guide rail and which defines a load path section of an endless circulating path provided in the vertical section. The endless circulating path includes the load path section, a return path section and a pair of curved connecting path sections, connecting the corresponding ends of the load and return path sections. A plurality of rolling members, such as balls or rollers, are filled in the endless circulating path. Thus, when the rolling members are located in the load path section, they are brought into contact with both of the inner and outer guide grooves.

The auxiliary slider includes at least a horizontal section and a vertical section which depends from one end of the horizontal section, thereby defining a generally L-shaped cross section. The auxiliary slider is provided with at least one endless circulating path whose load path section is defined at the bottom surface of the horizontal section, so that a rolling contact is provided between the bottom surface of the vertical section of the auxiliary slider and the top guide surface of the auxiliary guide rail. A gap is provided between the side surface of the auxiliary guide rail and the inner side surface of the vertical section of the auxiliary slider so that any error in alignment between the main and auxiliary guide rails can be absorbed in this gap. In an alternative embodiment, the auxiliary guide rail also has at least one bottom guide surface and a rolling contact is provided between the bottom guide surface of the auxiliary guide rail and the auxiliary slider.

With this structure, any error in alignment between the pair of main and auxiliary guide rails can be suitably absorbed in the gap between the opposed side surfaces of the auxiliary guide rail and the auxiliary slider, so that an alignment error between the main and auxiliary guide rails up to several tens of microns can be tolerated without problems. In addition, since the present linear motion guide assembly includes a main linear motion guide sub-assembly and an auxiliary linear motion guide sub-assembly and the main linear motion guide sub-assembly can be provided by any of the typical prior art linear motion guide units, the present invention can be provided with ease and at low cost.

It is therefore a primary object of the present invention to provide an improved linear motion guide assembly suitable for carrying a load relatively large in weight as well as in size.

Another object of the present invention is to provide an improved double rail linear motion guide assembly simple in structure, easy to manufacture, high in accuracy and low at cost.

A further object of the present invention is to provide an improved double rail linear motion guide assembly which allows an increased tolerance in the alignment between the two rails and which has a constant sliding resistance and thus performance along the rails.

Other objects, advantages and novel features of the present invention will become apparent from the following detailed description of the invention when considered in conjunction with the accompanying drawings.

DESCRIPTION OF THE PREFERRED EMBODIMENTS

Figure 1:
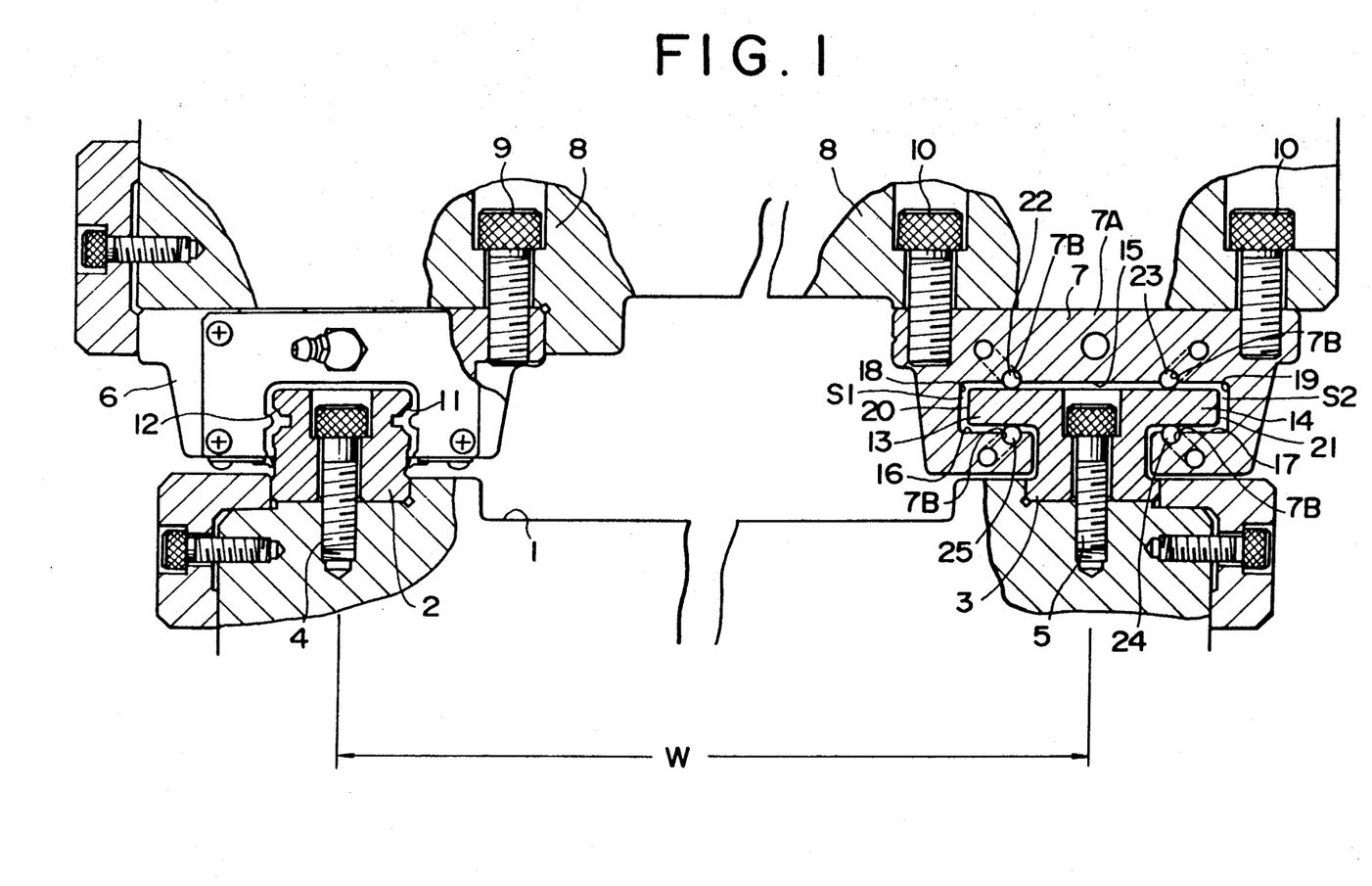
FIG. 1 is a schematic illustration showing in transverse cross section a double rail linear motion guide assembly constructed in accordance with one embodiment of the present invention.

Referring now to FIG. 1, there is schematically shown a double rail linear motion guide assembly suitable for carrying a load relatively large in size as well as in weight constructed in accordance with one embodiment of the present invention. As described before, generally speaking, the present linear motion guide assembly includes a main linear motion guide sub-assembly and an auxiliary linear motion guide sub-assembly, which are different in structure. Each of the main and auxiliary linear motion guide sub-assemblies includes a guide rail mounted on a base, a slider slidably mounted on the guide rail and a plurality of rolling members interposed between the guide rail and the slider. The present double rail linear motion guide assembly also includes a common slide table to which the slider of each of the main and auxiliary linear motion guide sub-assemblies is fixedly attached.

As illustrated in FIG. 1, a main guide rail 2 having a generally rectangular cross section is fixedly attached to a base 1 by bolts 4 and an auxiliary guide rail 3 having a generally T-shaped cross section is also fixedly attached to the base 1 by bolts 5 as spaced apart from each other and in parallel with the main guide rail 2 with a spacing W therebetween. The main guide rail 2 has a pair of opposite side surfaces, each of which is formed with an inner guide groove 11, 12 extending straight in parallel with the longitudinal axis thereof. A main slider 6 is slidably mounted on the main guide rail 2. The main slider 6 has a generally U-shaped cross section, and thus a horizontal section and a pair of vertical sections, each depending from a corresponding side of the horizontal section. Each of the vertical sections of the main slider 6 has an inner side surface which is formed with an outer guide groove extending straight in parallel with and an opposed relation with the associated inner guide groove 11, 12 of the main guide rail 2. As is well known in the art, each of the vertical sections of the main slider 6 is provided with an endless circulating path including a load path section, a return path section and a pair of curved connecting path sections, connecting the corresponding ends of the load and return path sections. The endless circulating path is filled with a plurality of rolling members, such as balls or rollers. The load path section of the endless circulating path is defined by the outer guide groove of the vertical section. Thus, those rolling members which are located in the load path section are in engagement with both of the inner and outer guide grooves so that a rolling contact is provided between the main guide rail 2 and the main slider 6.

It should thus be noted that the main guide rail 2, the main slider 6 and a plurality of rolling members (not shown) interposed therebetween define the main linear motion guide sub-assembly of the present invention. Therefore, the main linear motion guide sub-assembly essentially has a typical and well-known LM guide unit so that the main linear motion guide sub-assembly can be provided by a commercially available LM guide unit. Since the rolling members are in rolling contact with both of the inner 11, 12 and outer guide grooves of the main guide rail 2 and the main slider 6, respectively, both of vertical and horizontal loads can be carried by the main linear motion guide sub-assembly.

The auxiliary guide rail 3 has a generally T-shaped cross section and thus it includes a pair of side projections 13 and 14 extending horizontally in opposite directions and each terminating with a side surface 20, 21. Thus, the auxiliary guide rail 3 has a top guide surface and a pair of bottom guide surfaces spaced apart from each other. An auxiliary slider 7 is slidably mounted on the auxiliary guide rail 3, and the auxiliary slider 7 has a generally C-shaped cross section. Thus, the auxiliary slider 7 includes a main body 7A which is formed with a top guide surface 15 and a pair of bottom guide surfaces 16 and 17. The main body 7A also is formed with a pair of vertical or side guide surfaces 18 and 19 extending between the top and bottom guide surfaces 15 and 16, 17, and a gap S1, S2 is provided between the opposed side surfaces 18, 20 and 19, 21, respectively. Because of the provision of these gaps S1 and S2 on both side surfaces 20 and 21 of the side projections 13 and 14 of the auxiliary guide rail 3, a relative movement in the transverse direction between the auxiliary slider 7 and the auxiliary guide rail 3 can be allowed to absorb any error in alignment between the main and auxiliary guide rails 2 and 3.

The main body 7A of the auxiliary slider 7 is provided with four endless circulating paths which are filled with a plurality of rolling members, or balls 22, 23, 24 and 25, respectively, in the illustrated embodiment. Each of these endless circulating paths includes a load path section defined by an outer guide groove 7B, a return path section, and a pair of curved connecting path sections connecting the corresponding ends of the load and return path sections. Thus, those balls 22, 23, 24 and 25 which are located in the outer guide grooves 7B are partly exposed and thus in rolling contact with the associated top and bottom guide surfaces of the auxiliary guide rail 3. Since the top and bottom guide surfaces of the auxiliary guide rail 3 are flat surfaces, those balls 22, 23, 24 and 25 which are located in the outer guide grooves 7B may rollingly move not only in the longitudinal direction of the auxiliary guide rail 3, but also in its transverse direction. The rolling contact between the auxiliary guide rail 3 and the auxiliary slider 7 may be set in any desired condition, such as under pressure or zero allowance condition. It should be appreciated that in this embodiment the auxiliary guide rail 3, auxiliary slider 7 and the balls 22, 23, 24 and 25 define an auxiliary linear motion guide sub-assembly of the present invention.

The main slider 6 is fixedly attached to a common slide table 8 by means of bolts 9 and the auxiliary slider 7 is fixedly attached to the common slide table 7 by means of bolts 10 similarly. It should be noted that in practice two or more main linear motion guide sub-assemblies can be fixedly attached to the slide table 8 as arranged in a row extending in parallel with the longitudinal direction of the main guide rail 2, and, similarly, two or more auxiliary linear motion guide sub-assemblies can also be fixedly attached to the slide table 8 as arranged in a row extending in parallel with the longitudinal direction of the auxiliary guide rail 3. Such a structure allows to make the slide table larger in size in its longitudinal direction.

Figure 2:
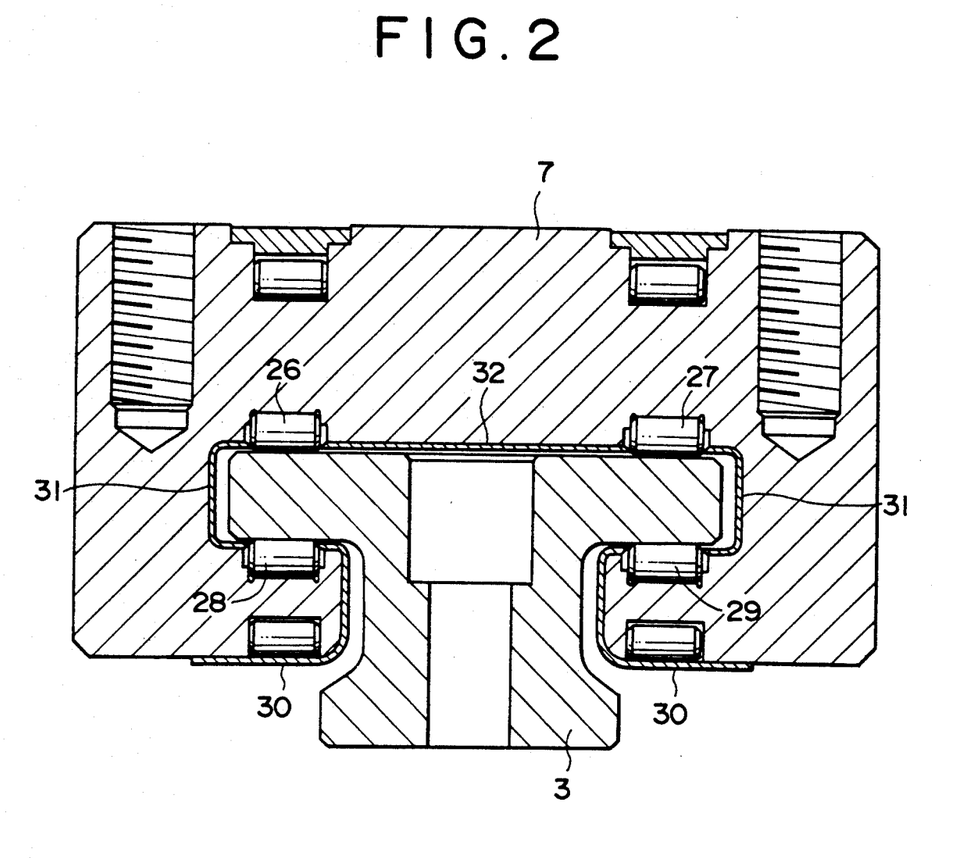
FIGS. 2 and 3 are schematic illustrations showing in transverse cross section two alternative modifications to the structure shown in FIG. 1.

FIG. 2 illustrates a modification of the structure shown in FIG. 1. In this embodiment, use is made of rollers 26, 27, 28 and 29 in place of the balls 22, 23, 24 and 25, respectively, in the embodiment of FIG. 1. By selecting a proper diameter for the rollers 26, 27, 28 and 29 used, a desired pre-load can be applied between the auxiliary guide rail 3 and the auxiliary slider 7. Also shown are roller retainer plates 30, 31 and 32 for keeping the rollers 26, 27, 28 and 29 in position as they roll along their endless circulating paths. The remaining structure is basically the same as shown in FIG. 1.

In the embodiments shown in FIGS. 1 and 2, the auxiliary linear motion guide sub-assemblies can sustain both of loads directed upwardly and downwardly. However, if it is only desired to sustain the vertically downward load, the balls 24 and 25 in the embodiment shown in FIG. 1 and the rollers 28 and 29 in the embodiment shown in FIG. 2 can be discarded.

Figure 3:
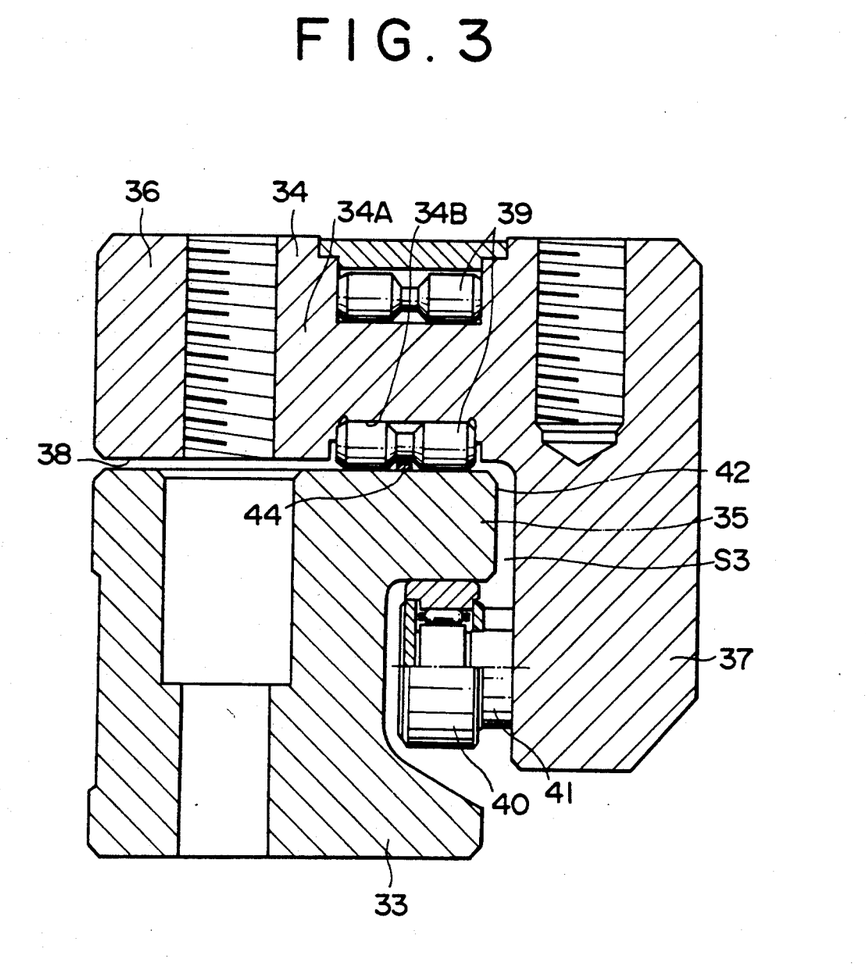

FIG. 3 illustrates another modification of the structure shown in FIG. 1. Unlike the embodiments shown in FIGS. 1 and 2 having a symmetrical structure, the auxiliary linear motion guide sub-assembly of this embodiment has an asymmetrical structure. That is, as shown in FIG. 3, there is provided an auxiliary guide rail 33 having only one side projection 35 which projects from one side of the rail 33 and terminates with a side surface 42. Thus, the auxiliary guide rail 33 has a flat top guide surface, which is mainly defined by a top surface of the side projection 35, and a flat bottom guide surface, which is defined by a bottom surface of the side projection 35. The present auxiliary linear motion guide sub-assembly also includes an auxiliary slider 34 including a main body 34A having a horizontal section 36, which is located above the auxiliary guide rail 33, and a vertical section 37, which depends from one side of the horizontal section 36, thereby defining a generally L-shaped cross section.

The horizontal section 36 of the auxiliary slider 34 is formed with a guide surface 38 at its bottom, in which an outer guide groove 34B is formed. The outer guide groove 34B corresponds to a load path section of an endless circulating path, which also includes a return path section and a pair of curved connecting path sections connecting the corresponding ends of the load and return path section as described previously. A plurality of rollers 39 are provided in the endless circulating path of this embodiment. On the other hand, an eccentric cam follower 40 is mounted on a shaft 41 which projects horizontally from an inner side surface of the vertical section 37, and the cam follower 40 is in contact with the flat bottom guide surface of the side projection 35. The position of the cam follower 40 relative to the side projection 35 may be adjusted by rotating the shaft 41, so that a desired pre-load condition may be established between the auxiliary guide rail 33 and the auxiliary slider 34. In addition, even if the pre-load condition given by the eccentric cam follower 40 is set to be zero, a desired pre-load condition can still be set by proper selection of the diameter of the rollers 39 used.

Of importance, a gap S3 is provided between the side surface 42 of the side projection 35 and the inner side surface 43 of the vertical section 37. Because of provision of such a gap S3, a relative movement in the transverse direction between the auxiliary guide rail 33 and the auxiliary slider 34 can be absorbed over a predetermined amount. Such a structure allows to relax the tolerance in the accuracy of alignment between the main and auxiliary guide rails 2 and 33. Also shown in FIG. 3 is a roller retainer band 44 for retaining the rollers 39 in position as they rollingly move along the load path section. In this embodiment, use is made of the eccentric cam follower 40; however, use may be made of any other alternative means, such as roller followers and radial bearings.

As described above in detail, since a predetermined gap in the sidewise direction is provided in the auxiliary linear motion guide sub-assembly to allow a relative movement between its auxiliary guide rail and its auxiliary slider, errors up to the order of several tens of microns can be allowed in the accuracy in parallel alignment between the main and auxiliary guide rails without any problems. Therefore, the sliding resistance will remain substantially unchanged over the entire distance of the guide rails, so that a constant and uniform linear motion guide performance can be insured. Besides, since the linear motion guide operation is very smooth and no undesired forces are applied, the service life of the assembly can be extended. Moreover, since the accuracy in alignment between the main and auxiliary guide rails is significantly reduced, the assembly can be manufactured with ease and at low cost. In addition, since the main linear motion guide sub-assembly of the present invention has a structure identical in nature to that of a variety of commercially available linear motion guide units, the manufacturing of the present assembly can be made even more easier and cheaper.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A double rail linear motion guide assembly, comprising:
   a slide table;
   a first linear motion guide sub-assembly fixedly attached to said slide table by means of first fixing means, said first linear motion guide sub-assembly including a first guide rail extending straight over a desired length and fixedly attached to a base, said first guide rail having a pair of opposite side surfaces, each of which is formed with an inner guide groove extending in parallel with a longitudinal axis of said first guide rail, a first slider fixedly attached to said slide table and slidably mounted on said first guide rail, said first slider being formed with a pair of outer guide grooves each of which are located opposite to a corresponding one of said inner guide grooves, and a plurality of rolling members interposed between said first guide rail and said first slider as partly received in both of a pair of said inner and outer guide grooves;
   a second linear motion guide sub-assembly fixedly attached to said slide table by means of second fixing means, said second linear motion guide sub-assembly including a second guide rail having a flat top guide surface, said second guide rail extending straight and substantially in parallel with said first guide rail and fixedly attached to said base, a second slider having a bottom guide groove fixedly attached to said slide table and slidably mounted on said flat top surface of said second guide rail and a plurality of rolling members interposed between said second guide rail and said second slider and partly received in said bottom guide groove; and
   whereby a predetermined gap is provided between said second guide rail and said second slider in a transverse direction perpendicular to a longitudinal axis of said second guide rail to allow a relative movement between said second slider and said second guide rail in the transverse direction as said second slider slidably moves along said second guide rail.

2. The assembly of claim 1, wherein said first guide rail has a predetermined cross sectional shape extending in parallel with the longitudinal axis of said first guide rail, and said first slider has a generally U-shaped cross section including a horizontal section and a pair of vertical sections, each depending from a corresponding side of said horizontal section and each being provided with an endless circulating path including a load path section, a return path section and a pair of curved connecting path sections connecting the corresponding ends of said load and return path sections, wherein each of said vertical sections has an inner side surface formed with the outer guide groove which corresponds to said load path section and which is located opposite to an associated one of said inner guide grooves when assembled.

3. The assembly of claim 2, wherein said first fixing means includes bolts.

4. The assembly of claim 2, wherein said second guide rail includes a pair of side projections which project in opposite directions transversely over a predetermined length to determine a generally T-shaped cross section, thereby defining a flat top guide surface and a pair of flat bottom guide surfaces, and said second slider has a generally C-shaped cross section to substantially enclose said T-shaped second guide rail and is provided with a plurality of endless circulating paths filled with a plurality of rolling members which are partly brought into rolling contact with said flat top and bottom guide surfaces of said second guide rail.

5. The assembly of claim 4, wherein said predetermined gap is provided between a side surface of each of said side projections and an inner side surface of said second slider located opposite to said side surface.

6. The assembly of claim 5, wherein said plurality of endless circulating paths includes a first pair of endless circulating paths each having an outer guide groove facing opposite to said flat top guide surface and a second pair of endless circulating paths each having an outer guide groove facing opposite to an associated one of said bottom guide surfaces.

7. The assembly of claim 2, wherein said second guide rail includes a side projection extending in a transverse direction perpendicular to the longitudinal direction of said second guide rail, terminating with a side surface and having a flat top guide surface and a flat bottom guide surface, and said second slider includes a horizontal section located above said second guide rail and a vertical section depending from one end of said horizontal section and having an inner side surface opposite to and spaced apart from said side surface of said side projection by said predetermined gap.

8. The assembly of claim 7, wherein said horizontal section is provided with an outer guide groove at its bottom surface, said outer guide groove defining the load path section of said endless circulating path which is filled with said plurality of rolling members, and engaging means is projectingly provided at said inner side surface of said vertical section for engaging with the bottom guide surface of said side projection.

9. The assembly of claim 8, wherein said engaging means includes a shaft extending horizontally from said inner side projection of said vertical section and an eccentric cam follower mounted on said shaft, said eccentric cam follower being engageable with said bottom guide surface of said side projection.

10. The assembly of claim 1, wherein said second fixing means includes bolts.

11. The assembly of claim 1, wherein said plurality of rolling members include balls.

12. The assembly of claim 1, wherein said plurality of rolling members include rollers.

13. The assembly of claim 1 wherein said gap comprises a pair of gaps extending between outer and side edges of said second guide rail and opposed inner side edges of said second slider.

* * * * *